(12) United States Patent
Wolfsteiner et al.

(10) Patent No.: US 6,722,477 B1
(45) Date of Patent: Apr. 20, 2004

(54) BRAKE ACTUATOR

(75) Inventors: Peter Wolfsteiner, München (DE); Erich Fuderer, Fürstenfeldbruck (DE); Josef Staltmeir, München (DE)

(73) Assignee: Knorr-Bremse Systeme für Schienenfahrzeuge GmbH, Munich (DE)

( * ) Notice: Subject to any disclaimer, the term of this patent is extended or adjusted under 35 U.S.C. 154(b) by 40 days.

(21) Appl. No.: 10/088,756

(22) PCT Filed: Sep. 22, 2000

(86) PCT No.: PCT/EP00/09271

§ 371 (c)(1), (2), (4) Date: Jul. 18, 2002

(87) PCT Pub. No.: WO01/21977

PCT Pub. Date: Mar. 29, 2001

(30) Foreign Application Priority Data

Sep. 23, 1999 (DE) .......................................... 199 45 701

(51) Int. Cl.[7] .............................................. F16D 55/16
(52) U.S. Cl. ....................... 188/72.9; 188/72.1; 188/173
(58) Field of Search ............... 188/72.1, 72.2, 188/72.9, 173, 73.43, 197, 217, 153 A, 28, 56, 43; 192/89.2, 90; 74/89.29

(56) References Cited

U.S. PATENT DOCUMENTS

| | | | | |
|---|---|---|---|---|
| 3,610,376 A | * | 10/1971 | Baronnet et al. | 188/202 |
| 3,937,295 A | * | 2/1976 | Wright | 180/271 |
| 4,532,462 A | * | 7/1985 | Washbourn et al. | 318/372 |
| 4,557,355 A | * | 12/1985 | Wilke et al. | 188/173 |
| 4,651,852 A | * | 3/1987 | Wickham et al. | 477/4 |
| 4,805,740 A | * | 2/1989 | Wilke et al. | 188/173 |
| 5,501,305 A | * | 3/1996 | Stalmeir et al. | 188/167 |
| 5,620,077 A | * | 4/1997 | Richard | 192/12 D |
| 5,803,211 A | * | 9/1998 | Wilke | 188/173 |
| 6,494,033 B1 | * | 12/2002 | Davies | 60/226.2 |

* cited by examiner

*Primary Examiner*—Jack Lavinder
*Assistant Examiner*—Benjamin A. Pezzlo
(74) *Attorney, Agent, or Firm*—Barnes & Thornburg (57) ABSTRACT

The invention relates to a brake actuator, especially a brake actuator for rail vehicle brake calipers for a disc brake. Said brake actuator comprises a service brake unit with an electromotive drive system for clamping and releasing the brake, a safety brake unit with a pre-loaded spring device for clamping the brake, and a brake spindle for converting the movements of the electromotive drive system into a translatory movement for activating a brake clamping mechanism; especially for activating brake calipers. The invention is characterized in that the pre-loaded spring device and the brake spindle are positioned coaxially in relation to each other and are mechanically series-connected.

17 Claims, 10 Drawing Sheets

FIG.1

RELEASE POSITION

FIG.5 RELEASE POSITION WITH WEAR ADJUSTMENT

FIG.6
SERVICE BRAKING WITH WEAR ADJUSTMENT

BRAKE ACTUATOR

The invention relates to a brake actuator, particularly for a rail vehicle caliper for a disk brake From German Patent Document DE 195 14 463 C1, a caliper unit for disk brakes of vehicles, particularly rail vehicles, is known which has a caliper with two caliper levers, one of these caliper levers being operable by way of an eccentric transmission and the other caliper being disposed on a housing. This caliper unit represents a brake actuator which, on the one hand, has an electric-motor drive and, on the other hand, comprises a safety braking unit with an accumulator device for the application of the brake.

German Patent Document DE 198 04 454 A1 shows an electromechanically operable disk brake for motor vehicles. In the case of this disk brake, the reduction gear is constructed as a roller thread gear with a return of the thread rollers.

German Patent Document DE 30 48 766 shows an application device for parking brakes of rail vehicles, which is also operated by an electric motor. By way of a reduction gear, this electric motor has a conversion gear for converting the rotating movement to a longitudinal movement of an actuating member.

Furthermore, European Patent Document EP 0 129 969 shows a brake actuator which permits by way of an electric motor arrangement the tensioning of a spring generating a braking force.

Essentially, two wheel brake systems are currently used in the rail vehicle field: Pneumatic braking systems (which also may include electropneumatic systems and vacuum brakes) and (electro)hydraulic braking systems. So far, purely electromechanical braking systems have not been significantly successful on the market.

In both technologies, the generating of force is implemented by pistons in cylinders which generally have only one operative direction. The restoring of the pistons takes place as a result of the forces, which occur because of the elastic deformation of the brake linkage, as well as as a result of restoring springs which, in addition, ensure the taking-up of an end position.

The local energy accumulation for the possibility of supply interruptions, in the case of pneumatic systems, takes place in compressed-air reservoirs, or, in the case of hydraulic systems in corresponding hydraulic reservoirs and, in the case of electromechanical systems, by booster batteries or a redundant power supply. In addition, passive systems contain the possibility of a one-time application by the energy accumulated in the spring.

Based on this background, it is an object of the invention to provide a brake actuator which ensures a high operational reliability and has a compact and cost-effective construction.

The invention achieves this goal by means of the object of Claim 1. In contrast to the prior art, the pre-loaded spring device and the brake spindle are arranged coaxially with respect to one another, which indicates a very space-saving and cost-effective arrangement of these structural members. As a result of this arrangement, it is also possible to connect the brake spindle and the pre-loaded spring mechanically "in series" in a simple manner such that it is prevented that, in the case of a service brake, they jointly generate the braking force. The safety spring can be utilized as a parking brake and also as an emergency brake in the case of a defect (such as a power failure, a failure of the electronic system or a motor failure). The low energy requirement while the braking forces are low is also an advantage.

Additional advantageous embodiments of the invention are contained in the remaining subclaims.

In the following, the invention will be described in detail with reference to the drawing by means of embodiments.

Figure 1:
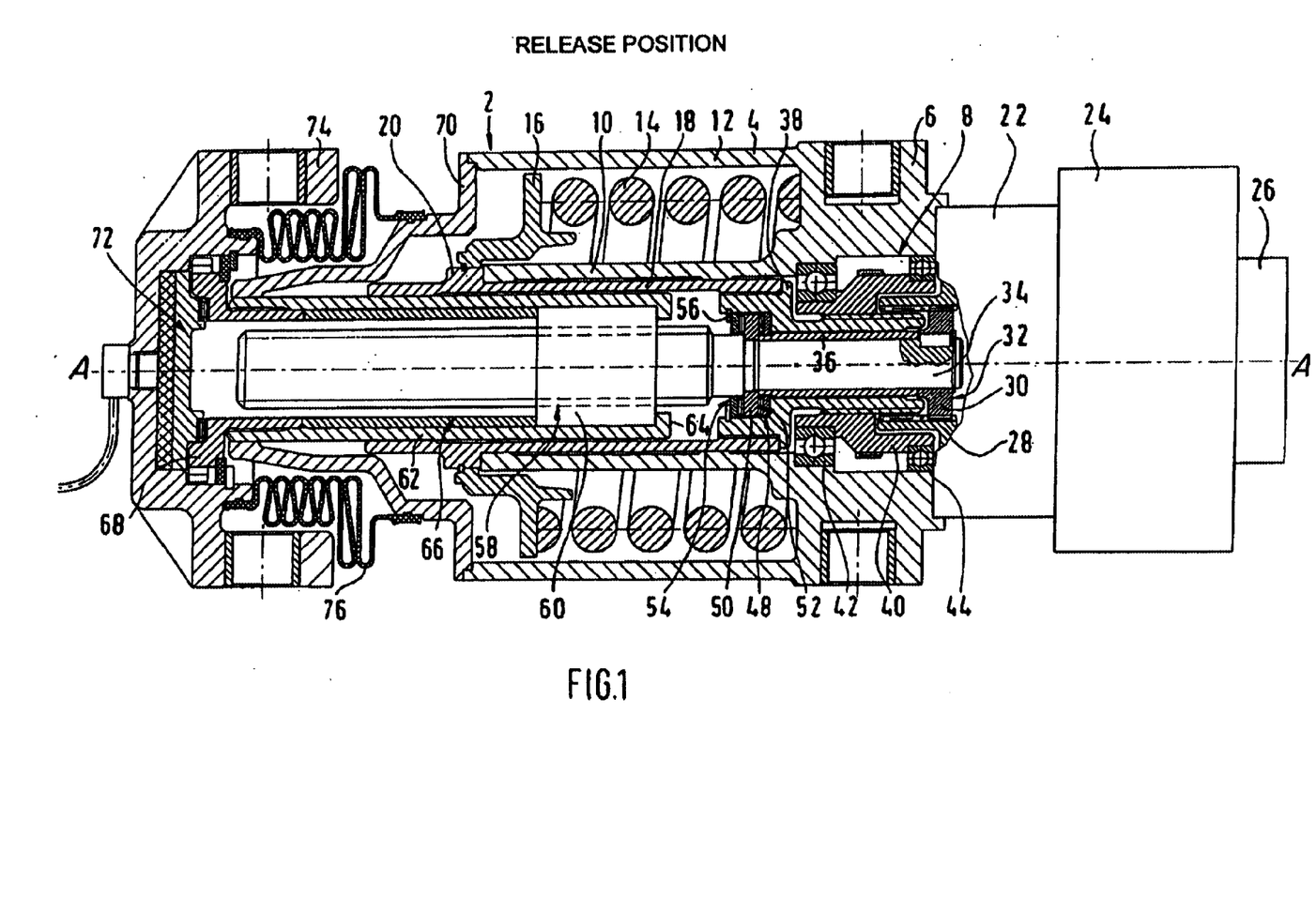
FIG. 1 is a view of a first embodiment of a brake actuator according to the invention for a caliper unit for rail vehicles.

FIG. 1 illustrates a brake actuator (often also called actuator) 2 with an essentially hollow-cylindrical housing 4 which is closed off toward an axial end by means of a cover section 6 which has a centric bore 8. Starting from the cover section 6, the housing 4 has an essentially double-walled construction, in which case a pre-loaded spring 14 is arranged in the space between the interior wall 10 and the exterior wall 12. The pre-loaded (coil) spring 14 is supported at one of its ends at the cover section 8; at its other axial end, it acts upon a ring-type slide 16 which, on its inner circumference, is fastened on a sleeve 18 having a collar 20. The outer circumference of the sleeve 18 is displaceably guided on the inside of the interior wall 10. By means of its end facing away from the cover section, the sleeve 18 projects past the axial end of the interior wall 10 by means of the collar 20 axial beyond the end of the housing 4.

On the cover section 6, a transmission 22, an electric motor 24 and (for example, an electromagnetic) blocking brake 26 are joined in this axial sequence to the side facing away from the pre-loaded spring 14. On its axial side pointing to the cover section, the transmission 22 has a hollow-shaft projection 28 as an output shaft. On its inner circumference, the hollow shaft projection 38 is provided with axially extending grooves into which the outer sections of an impeller/driver 30 engage by means of axially aligned blades 32. In this manner, the driving device 30 has a non-rotatable but axially displaceable construction relative to the hollow shaft 28. The driving device 30 is fastened on the axial end circumference of a pin (also called brake spindle) 34 whose one axial end is situated in the hollow shaft 28 and whose other axial end projects beyond the axial end of the housing 4 into the braking force generator.

Figure 2:
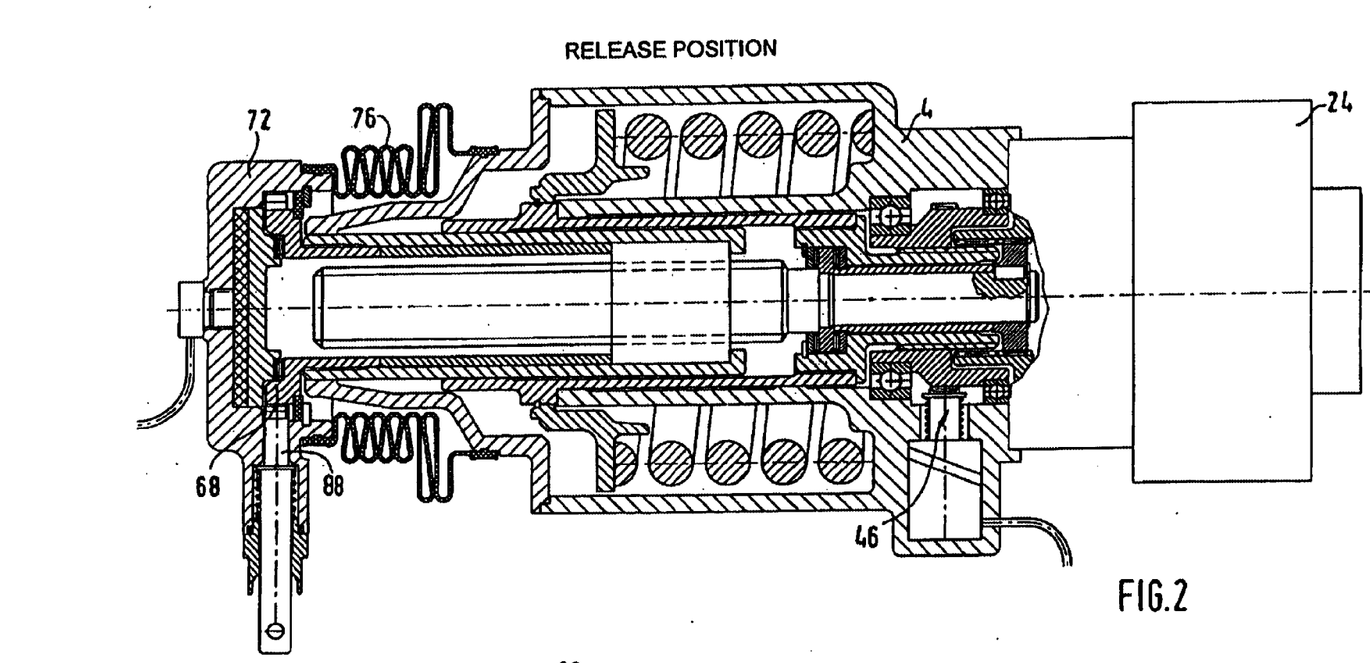
FIG. 2 is a sectional view along Line A—A of FIG. 1.

Two axial sleeves 36, 38 are placed over the pin 34 in the axial area of the pin 34 adjoining the driver. The outer sleeve, a spindle sleeve 38, is displaceable on the inner sleeve 36 and is rotatable relative to it. On its outer circumference, the outer spindle sleeve 38 is provided approximately over half of its axial dimension in its area pointing to the cover section with an external thread which engages in the internal thread of a nut 40 screwed onto the spindle sleeve 38. The nut 40 is rotatably disposed in the housing 4 by means of two bearings 42, 44 and can be locked in its rotating position by way of a magnetically operating locking mechanism or a lock 46 (see FIG. 2).

At its axial end facing away from the external thread, the spindle sleeve 38 has a stepped construction. One end of the sleeve 20 is screwed (or otherwise fastened) on the outer circumference of the stepping 48. The axial end of the spindle sleeve 38 facing away from the cover section 6 is supported on a disk 50 by means of axial bearings 52, 54 which, in turn, are axially secured by a snap ring 56 situated in a groove of the inner circumference of the spindle sleeve 38. The disk 50 is in addition supported on a radial stepping of the pin 34.

In the area adjoining the axial end of the spindle sleeve 38, the pin 34 is provided with a modular nut/spindle unit 58 which can be implemented, for example, as a recirculating ball spindle, as a roller thread drive or as a planetary rolling thread drive. During rotations of the spindle or of the pin 34, the nut 60 is rotated on the pin 34 and, in the process, takes along the sleeve 62 fastened on its outer circumference. At its inner circumference, the sleeve 62 is provided with a radial projection 64 which fixes the nut toward an axial side. On its other side, the fixing of the nut 60 takes place by a bush 66 which is axially joined to the nut and which, in turn, is axially secured by, way of a ring 68 fastened to the inner circumference of the sleeve 62. A separate housing cover 70 with a stepped cross-sectional geometry extends between the axial end circumference of the bush 62 and the axial end of the housing 4.

The ring or nut 68 is radially disposed on a yoke device 72 (see also FIG. 2) which comprises a ring housing element 74 to which a lever of a caliper can be fastened. Between the ring housing element 74 and the housing cover 70, bellows 76 are arranged for sealing off the yoke device 72 with respect to the housing cover 70 displaceable relative to the yoke device 72.

Figure 3:
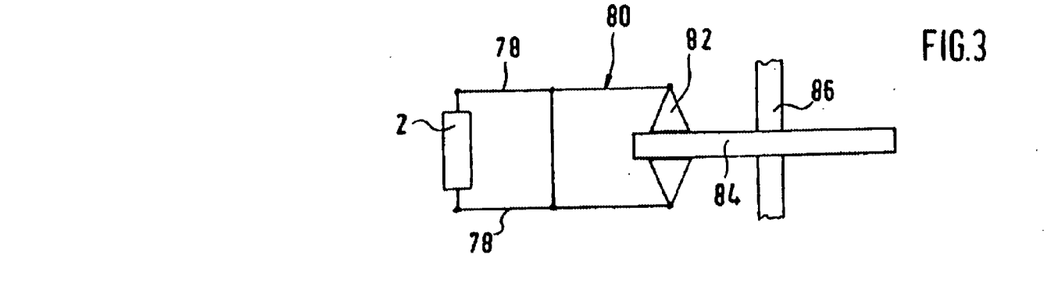
FIG. 3 is a schematic diagram which illustrates the installation principle of the brake actuator according to the invention in a rail vehicle caliper unit.

The arrangement of the brake actuator or braking force generator 2 in a disk brake for rail vehicles is illustrated in the schematic diagram of FIG. 3. The brake actuator 2 acts upon one end respectively of the levers 78 of a caliper 80 for the application of brake clips 82 in the direction of the brake disk 84 which are fastened on a shaft 86. In this case, the yoke device 72 is pushed away from the housing 4 toward the outside so that the caliper 80 is applied.

The brake actuator according to the invention is characterized in that, while the arrangement is constructionally simple, it is possible to mutually combine in a particularly compact manner two application techniques, which are completely separate from one another, because the brake can be applied by the pre-loaded spring 14 as well as by the electric motor 24, the pre-loaded spring 14 forming a safety level for the brake in the event of a failure of the electric motor.

The essential functional blocks of the brake are the housing 4; the motor/transmission unit (with the motor brake 26) 22, 24 for driving the thread brake spindle 34; the nut-spindle unit (brake spindle) 58 for converting the rotating movement to a translatory displacement; the yoke device 72 with the emergency release and force sensing device for applying the application force to the caliper 80; the pre-loaded spring 14 (safety spring); the second nut-spindle unit consisting of the nut 40 and of the spindle sleeve 36 (pre-loaded spring spindle) with the locking mechanism for maintaining the tension of the pre-loaded spring 14 (brake 46 or lock; for example, with an electromagnetic actuation); a splined shaft profile for the translatory displacements between the spindle 34 and the drive (for engaging the spring accumulator).

Figure 4:
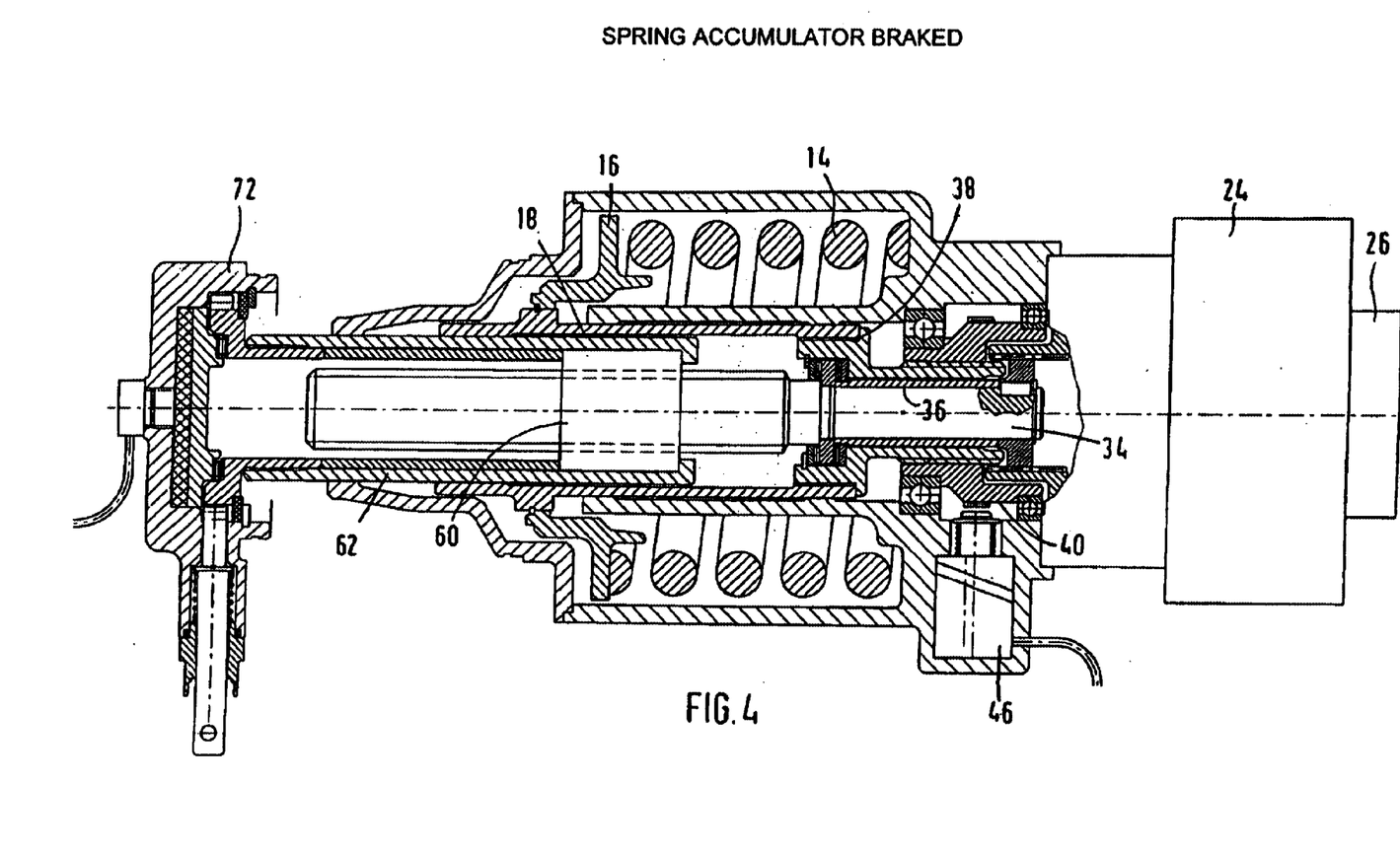
FIG. 4 is a view of the brake actuator of FIG. 1 in a braked position of the spring accumulator.

The operation of the brake during the engaging of the spring accumulator is illustrated in FIG. 4. This figure shows the braked position of the spring accumulator and thus illustrates the type of the movements of the brake components (rotation, translation or rotation and translation) during the braking.

By releasing the lock 76 on the nut 40, its holding function is eliminated; the pre-loaded spring 14 relaxes and by way of a displacement of the brake spindle 34 generates braking force. In this case, the engaged motor brake 26 prevents a reduction of the braking force by way of a rotation of the brake spindle 34. During the relaxing of pre-loaded spring 34, the latter advances the slide ring 16 which takes along the sleeve 18 s well as the spindle sleeves 34 and 38 (translation), the sleeve 62 as well as the entire yoke device 72 (translation). In this case, the nut 40 rotates on the spindle sleeve 38, but the spindle sleeve 38 as well as the other displacement elements do not rotate.

Figure 5:
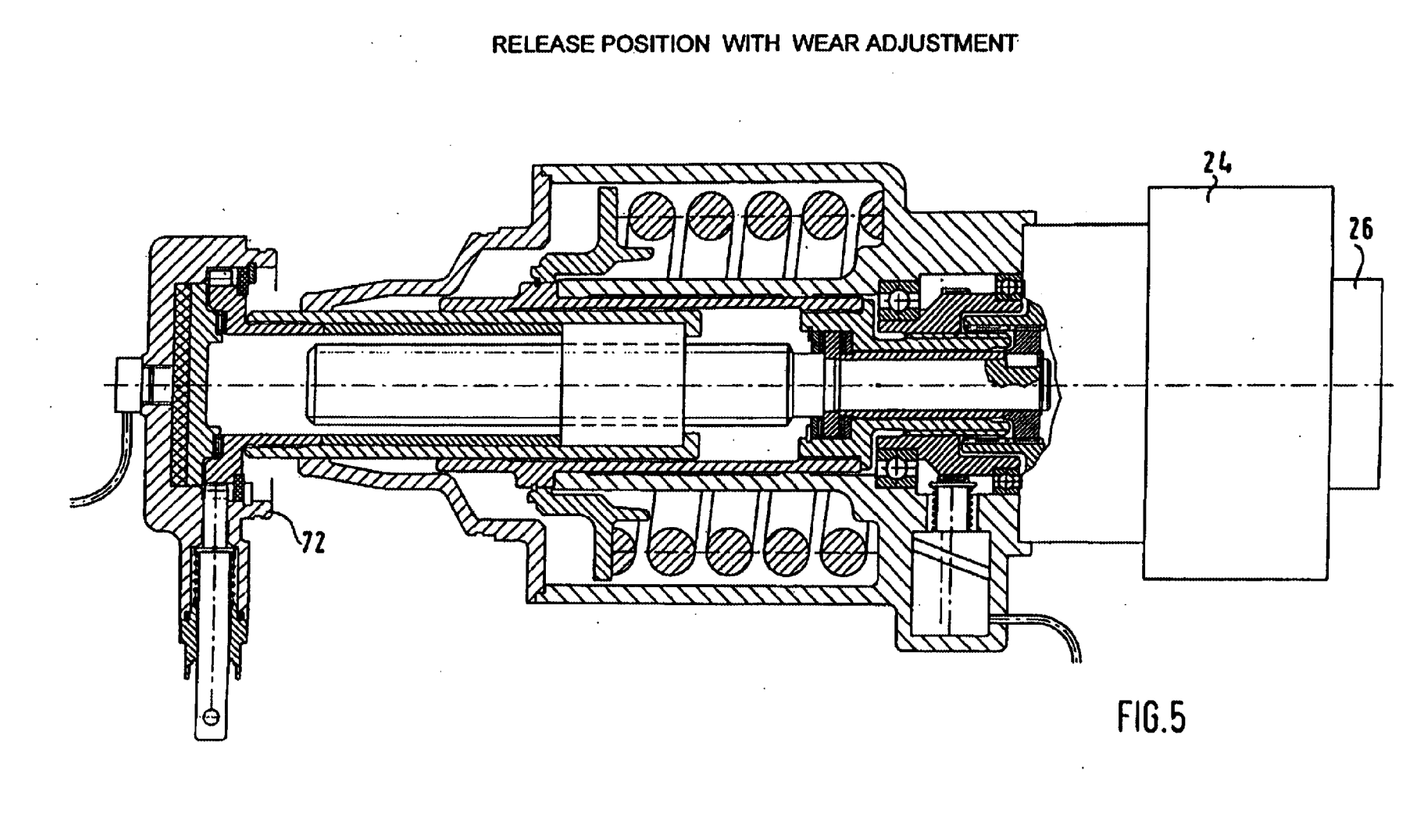
FIG. 5 is a view of the brake actuator of FIG. 1 in a released position of the spring accumulator.

For releasing the spring accumulator brake, the brake spindle 34 is driven by the electric motor 24 in the braking direction. Because the brake spindle 34 is supported by way of an axial bearing 52, 54 on the pre-loaded spring 14, the pre-loaded spring 14 is moved by the increased braking force, while the locking mechanism is released, into the release position. By engaging the locking 46, the pre-loaded spring 14 is held in the release position. After the locking of the pre-loaded spring 14, the electric motor 24 rotates in the release direction and thus reduces still existing braking force and adjusts a certain ventilating play on the brake linings (this process is not illustrated in Illustration 5). During the releasing of the "pre-loaded spring brake" the spindle 34 is rotated as well as translatorily withdrawn.

Figure 6:
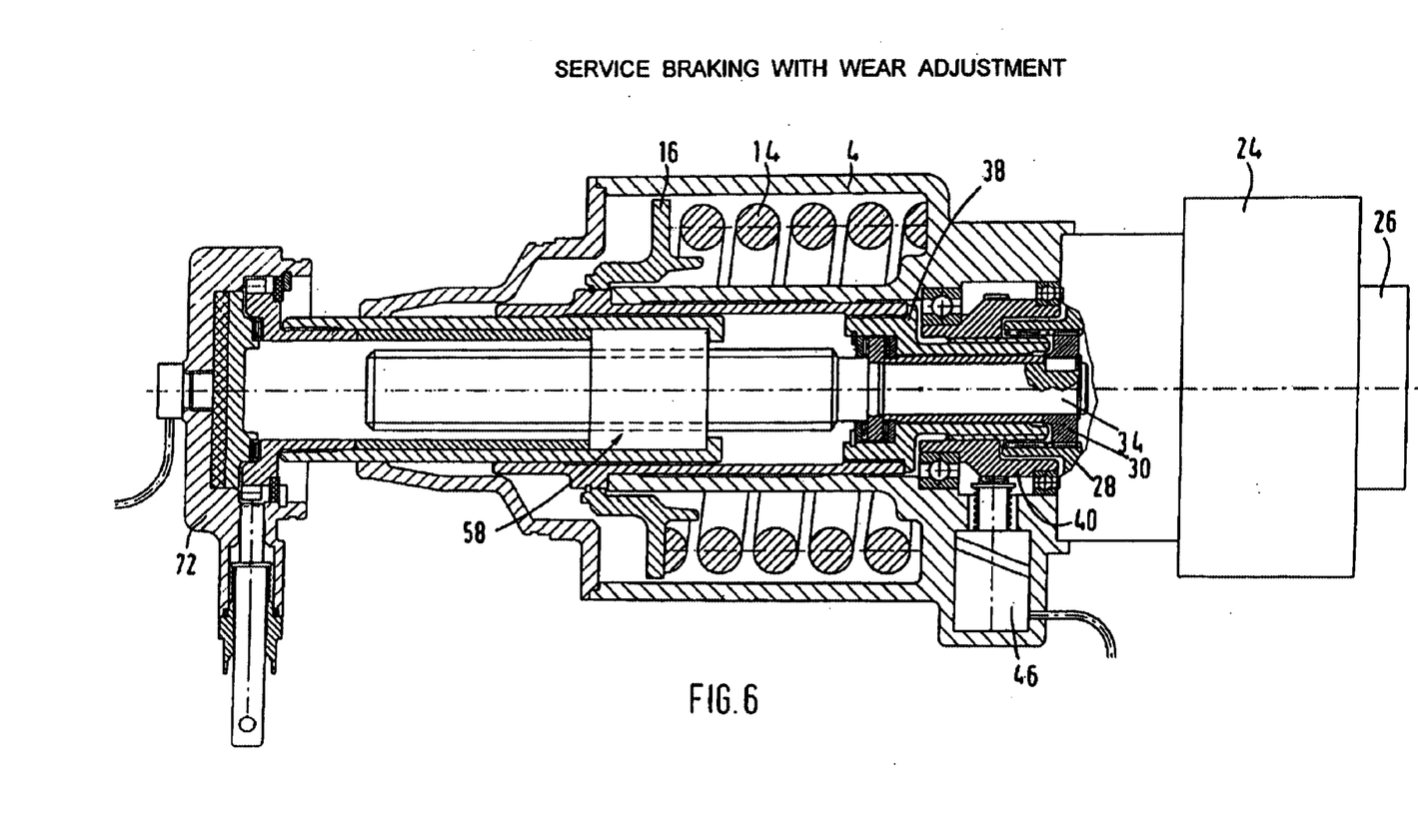
FIG. 6 is a view of the brake actuator of FIG. 1 during a service braking by means of the electric-motor drive.

In addition to brakings by an actuating of the spring accumulator brake, brakings can be implemented by utilizing the electromechanical drive. These service brakings take place exclusively by an actuation of the electric motor 24. The rotations of the hollow shaft 28 with the driving device 30 and the pin 34 in the braking direction, by way of the modular nut/spindle unit 58, result in a bridging of the ventilating play and subsequently in a buildup of braking force. In contrast, the rotations of the hollow shaft 28 in the opposite direction result in the reduction of braking force and to the buildup of the ventilating play. During an actuation of the electric motor 24, to the motor brake 26 must be released correspondingly. Because the lock 46 is blocked, the nut 40 cannot rotate so that the spindle sleeve 38 is also stopped, while the braking spindle 34 is rotated.

The maximal service brake stroke is designed such that it permits a wear adjustment. A separate adjusting device for the compensation of the lining wear is therefore no longer required.

For controlling the application force, a force sensing device can be integrated in the yoke device 72. In order to permit a targeted adjustment of the ventilating play during the release of the brake, in addition to this force sensor, a position sensor is also required. When a servo motor is used, the angle measuring device normally integrated in the motor can be used as the position sensor. Solutions are also conceivable which avoid an explicit force sensing, because it is possible to reconstruct the application force by way of the rigidity of the calipers 80 from a position measurement.

It is the purpose of the emergency release device 88 to be able to release the engaged spring accumulator brake when the energy supply fails. In the case of the above-illustrated variant of the actuator, this is achieved in that the torque support of the brake spindle nut (68) at the lock 88 in the yoke device 72 is released. The same effect may also be achieved by a releasing of the motor brake but the high transmission ratio and the resulting friction of the transmission between the motor and the spindle may possibly prevent a sufficient reduction of force.

Figure 7:
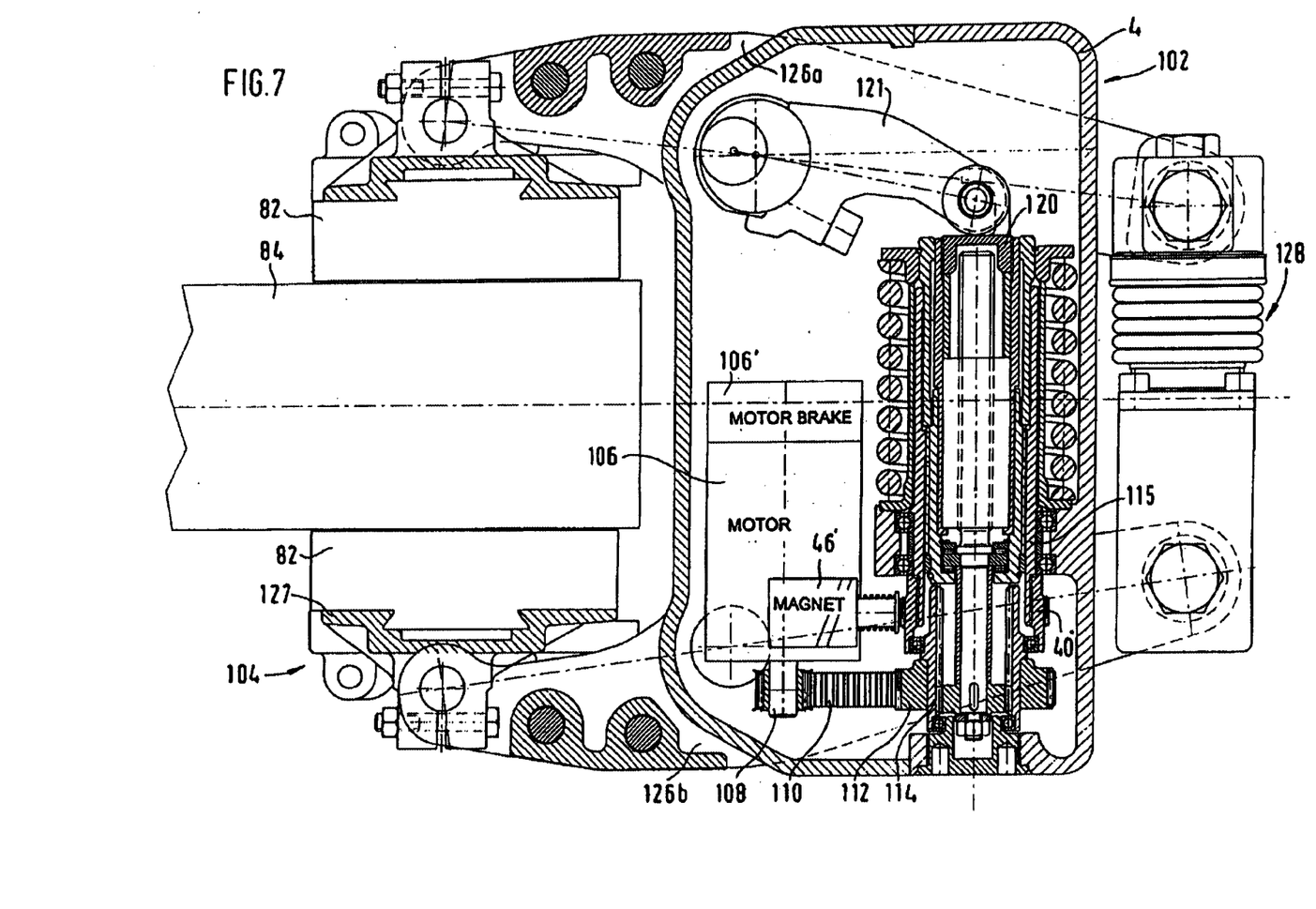
FIG. 7 is a view of another embodiment of a brake actuator according to the invention.
Figure 8:
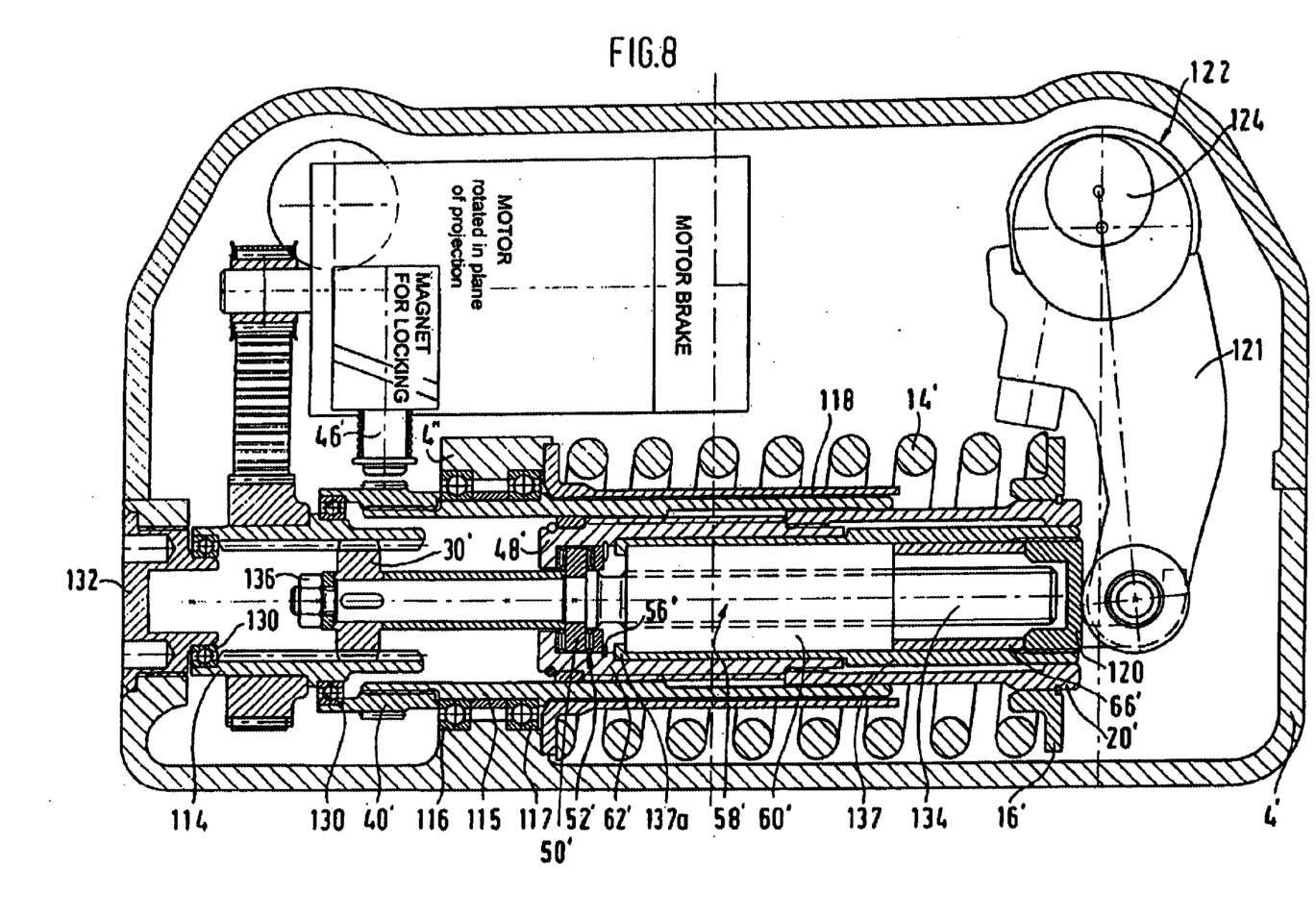
FIG. 8 is a view of the brake actuator of FIG. 7 in a braked position of the spring accumulator.

Another variant of the invention is illustrated in FIGS. 7 and 8. FIG. 7 illustrates an application device 102 for a rail vehicle disk brake 104. The application device 102 comprises an electric motor/transmission 106 (with a joined motor brake 106') whose output shaft 108 (or the output shaft of a transmission assigned to the electric motor 6), by way of a toothed belt 110, drives a pinion 112 which is fastened to a sleeve 114 provided on its axial inner circumference with axially extending grooves. The function of the sleeve corresponds to the function of the hollow shaft 28 of FIG. 1.

A nut 40' with a fixed internal-sleeve projection 115 is disposed on the sleeve 114, which projection 115 is provided with a non-selflocking internal thread which is screwed to a corresponding external thread of a sleeve 62'. The nut 40' can, in turn, be locked by way of a magnetic lock 46'. The internal sleeve projection 115 is disposed by way of bearings 116, 117 on an interior housing step 4" with a bore for a guiding-through of the brake spindle 134. Another sleeve 118 is situated on the outside around the sleeve projection 115, which sleeve 118 is supported on the collar 4" of the housing 4', which collar 4" is molded toward the inside to the housing 4'. The sleeve 118 forms a receiving device for the pre-loaded spring 14' arranged concentrically with respect to the sleeve 118. The pre-loaded spring 14', in turn, acts, at its end facing away from the housing collar, upon a ring-shaped slide 16' which is fastened on an interior sleeve 20' fastened on an interior bush 66 which, in turn, is disposed on a cover 120 which closes off the brake spindle space axially toward one side. A brake lever 121 is coupled to the exterior side of the cover (on the side facing away from the brake spindle), which brake lever 121 acts upon an eccentric 122. The eccentric 122 has an eccentric shaft 124 which is coupled to a caliper lever 126a which, together with a second caliper lever 126b, forms a caliper 80. At one end respectively of the caliper levers 126, lining holders 127 are in each case provided which have brake clips 82 displaceable in the direction of the axis (not shown here) of the brake disk 84. The ends of the caliper levers 126 facing away from the brake linings or the brake clips 82 are connected with one another by way of a plunger rod adjuster 128 which preferably has an electrically actuated design and comprises a force sensor and an emergency release device (not shown).

At its axial end with respect to the housing 4', the sleeve 114 is rotatably by means of a radial bearing 130 disposed on an inner cylindrical projection of a housing cover 132. The housing cover 132 can be removed from the outside and permits access to a hexagon 136 constructed at one axial end of the brake spindle 134, for the implementation of emergency release operations.

In the area axially adjoining the hexagon 136, a driving device 30' is fitted onto the brake spindle 134, so that the brake spindle 134 is axially displaceably guided in the exterior sleeve 114 but is non-rotatable relative to the sleeve 114. Between the sleeve 114 and the nut 40', the radial bearing 130 is provided, so that the nut 40' can freely rotate on the sleeve 114.

The brake spindle 134 and the sleeve 64 are supported with respect to one another by way of axial bearings 52' which, on the one side, are fixed in their position by a stepping (radial) of the thread brake spindle and, on the other side, by a stepping 48' of the sleeve 62. One end of the sleeve 20' is fastened to the outer circumference of the stepping 48'. The stepping 48' is supported on a disk 50' by means of axial bearings 52' which, in turn, are axially secured by a snap ring 56' situated in a groove of the inner circumference of the spindle sleeve 62.

In the area adjoining the axial end of the nut 40', the pin 134 is provided with a modular nut/spindle unit 58'. During rotations of the spindle or of the pin 134, the nut 60' is rotated on the pin 134 and, in the process, takes along the sleeve 137 fastened to its outer circumference. On one axial end, the sleeve 137 is provided with a radial projection 137a on the inner circumference, which radial projection 137a fixes the nut 60' toward an axial side. On the other side of the sleeve 137, the fixing of the nut 60' takes place by a bush 66' joined axially to the nut 60', which bush 66' is applied to the cover 120.

The eccentric mechanism represents an additional transmission ratio which permits a reduction of the actuator force by a multiple. A difference with respect to the first variant of FIG. 1 consists of the fact that the function of the wear adjustment is not integrated in the actuator. FIG. 7 therefore illustrates a separate adjusting device (128).

The function of the emergency release device can also be integrated in this separate adjusting device. As an alternative, a mechanism is also conceivable which is based on the rotation of the brake spindle. For reasons of space, the motor in this variant is not arranged coaxially with respect to the brake spindle but is laterally connected with it by way of the toothed belt 110. The different positions of the actuator in this variant are illustrated in FIGS. 8, 9, 10 corresponding to FIGS. 5, 6, 7.

According to FIG. 8, the lock 46' is released for operating the spring accumulator brake. This causes the nut 40' to rotate together with the sleeve 115, so that pre-loaded spring 14' can relax in that it axially advances the ring slide 16' which takes along the bush 20' and advances the bush 62' together with the brake spindle 134 axially in the sleeve 114.

Figure 9:
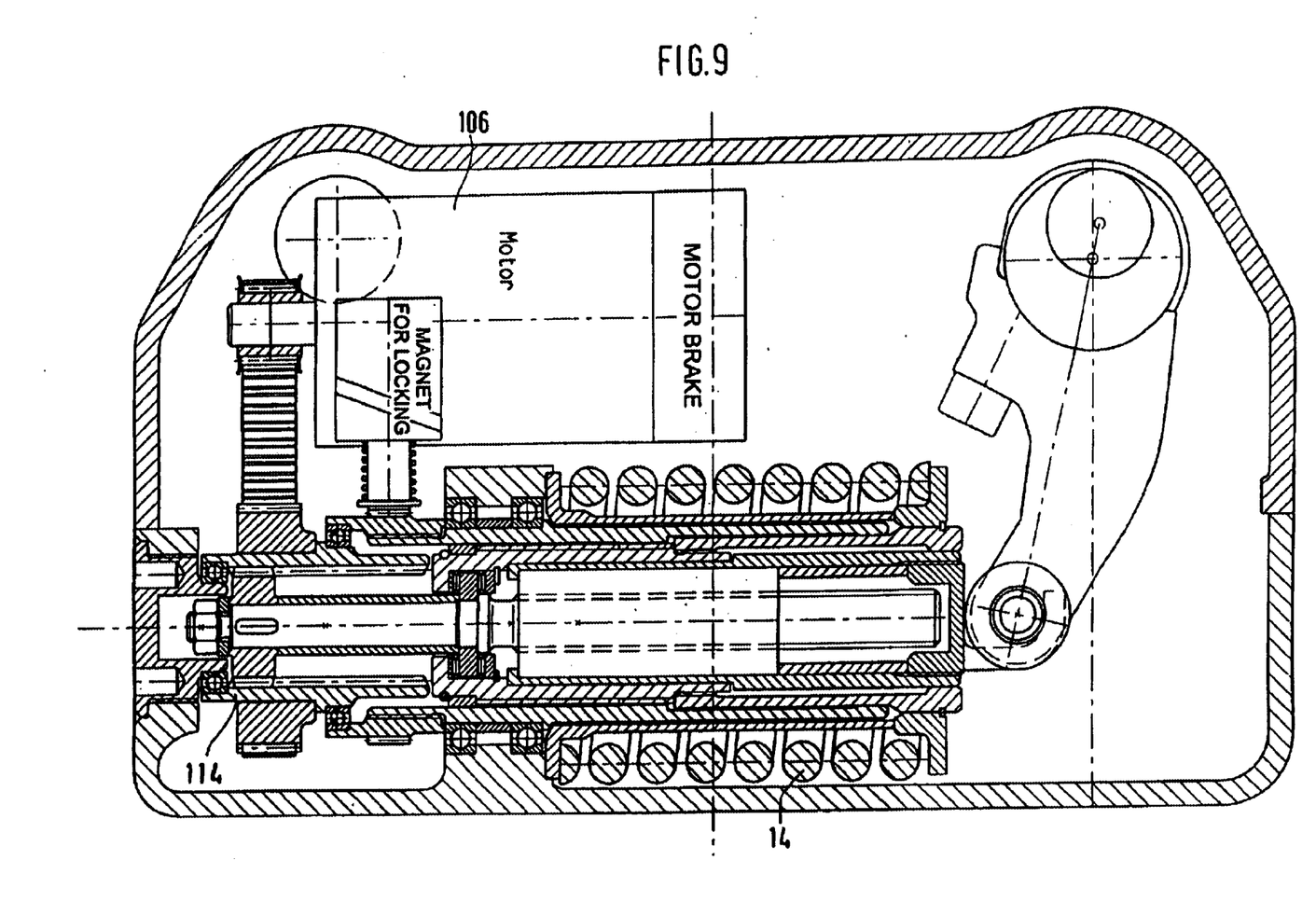
FIG. 9 is a view of the brake actuator of FIG. 7 in a released position of the spring accumulator.
Figure 10:
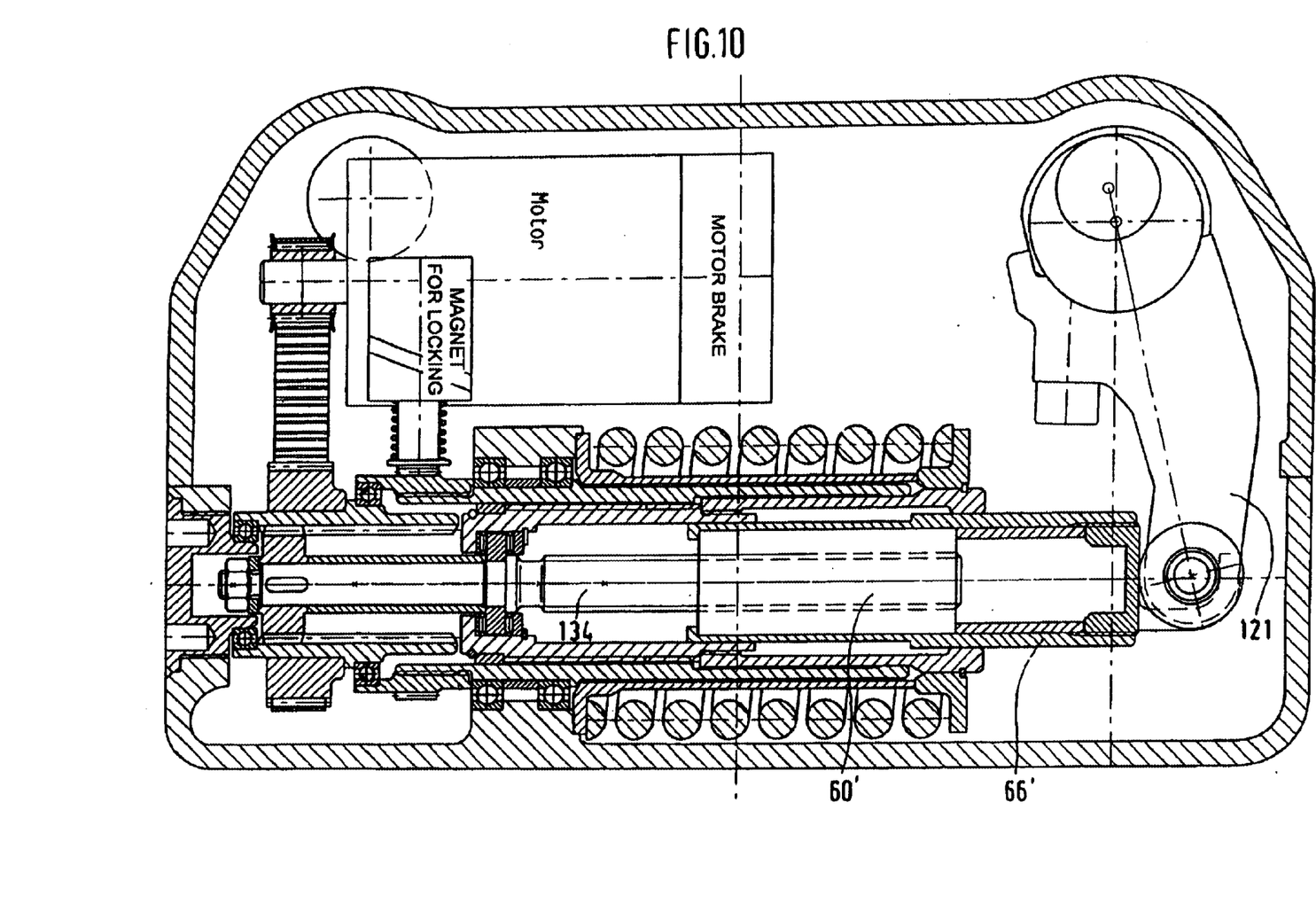
FIG. 10 is a view of the brake actuator of FIG. 7 during a service braking by means of the electric-motor drive.

According to FIG. 9, the releasing of the spring brake takes place by the electric drive which rotates the sleeve 114, tensioning the locked pre-loaded spring 14 and axially withdrawing the brake spindle 134 (see also FIG. 5).

A service braking takes place exclusively by means of the electric motor 106. The lock 46 prevents an unintentional relaxing of the pre-loaded spring 14. When the sleeve 114 is rotated, the driving device 32 and the brake spindle 134 will also rotate. In this case, the nut 60' rotates on the brake spindle, so that the sleeve 66 is axially advanced and presses the braking lever 121 forward. When the brake is released, the nut 60' is rotated back on the spindle, so that it withdraws axially.

Figure 11:
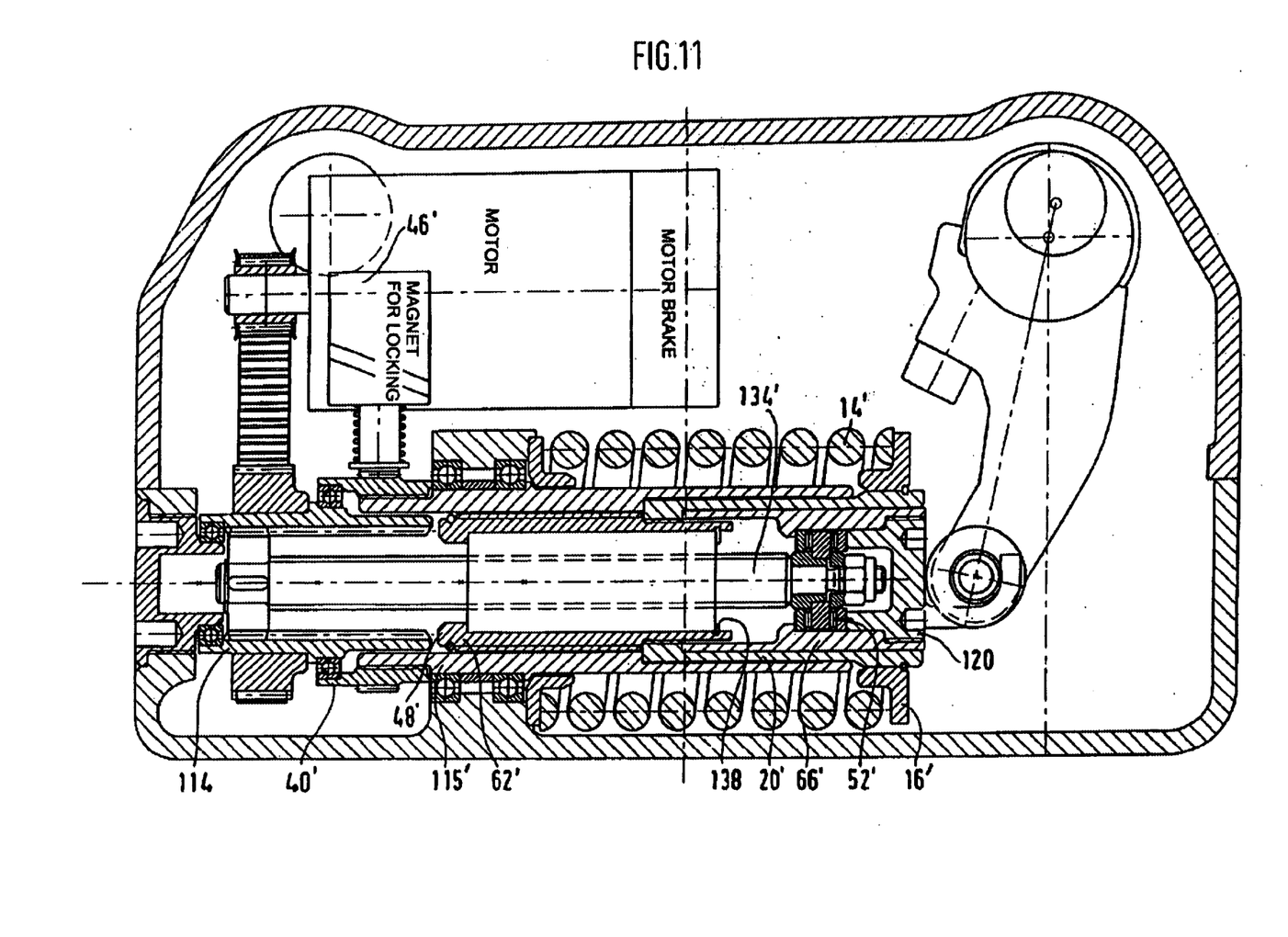
FIG. 11 is a view of a constructive variant of the embodiment of FIG. 7.

FIG. 11 differs from the example of FIG. 7 essentially by the manner of the support of the axial forces at the thread brake spindle. In this case, the sleeve projection 115' acts simultaneously as a receiving device for the pre-loaded spring 14'. The spring 14', in turn, acts upon a slide 16' which is fastened on a sleeve 20' which is disposed on an interior sleeve 66' In this embodiment, the supporting of the thread brake spindle takes place in the axial end area of the spindle 134' by means of axial bearings 52' which are fixed on an inner stepping of the sleeve 66' and on the cover 120. The nut is fixed in the bush 66' (on one side, by means of a collar 48'; on the other side, by means of another snap ring 138). The additional bushes/sleeve 137 and 118 of the embodiment of FIG. 7 are not necessary in this embodiment.

| Reference Numbers | |
|---|---|
| Brake force actuator | 2 |
| housing | 4 |
| cover section | 6 |
| bore | 8 |
| inner wall | 10 |
| outer wall | 12 |
| pre-loaded spring | 14 |
| slide | 16 |
| sleeve | 18 |
| collar | 20 |
| transmission | 22 |
| electric motor | 24 |
| blocking brake | 26 |
| hollow shaft projection | 28 |
| impeller/driver | 30 |
| blade | 32 |
| pin | 34 |
| sleeves | 36, 38 |
| nut | 40 |
| bearing | 42, 44 |
| magnetically acting lock | 46 |
| stepping | 48 |
| disk | 50 |
| bearings | 52, 54 |
| ring | 56 |
| modular nut/spindle unit | 58 |
| nut | 60 |
| sleeve | 62 |
| projection | 64 |
| bush | 66 |
| ring | 68 |
| housing cover | 70 |
| yoke device | 72 |
| ring housing element | 74 |
| bellows | 76 |
| lever | 78 |
| caliper | 80 |
| brake clips | 82 |
| brake disk | 84 |
| shaft | 86 |
| lock | 88 |
| application device | 102 |
| rail vehicle disk brake | 104 |
| electric motor/transmission | 106 |
| motor brake | 106' |
| output shaft | 108 |
| toothed belt | 110 |
| pinion | 112 |
| spindle sleeve | 114 |
| inner sleeve projection | 115 |
| bearing | 116, 117 |
| sleeve | 118 |
| cover | 120 |
| brake lever | 121 |
| eccentric | 122 |
| eccentric shaft | 124 |
| caliper lever | 126a |
| caliper lever | 126b |
| lining holder | 127 |
| plunger rod adjuster | 128 |
| radial bearing | 130 |
| housing cover | 132 |
| brake spindle | 134 |
| hexagon | 136 |
| sleeve | 137 |

What is claimed is:

1. Brake actuator, particularly for a rail vehicle brake, comprising:
    a service brake unit with an electric-motor drive for the application and release of the brake,
    a safety brake unit having at least one pre-loaded spring device for the application of the brake,
    a brake spindle for converting the rotating movement of the electric-motor drive to a translatory movement for the actuation of a brake application mechanism,
    the at least one pre-loaded spring device and the brake spindle being coaxial,
    the brake spindle and the pre-loaded spring device being mechanically connected in series such that forces from the spindle and the spring are not added to one another in any operating position on a brake lining, and
    the brake spindle is axially displaceably guided in, and non-rotatable relative to, one of an output shaft or in a first sleeve of a transmission of the electric-motor drive.

2. The brake actuator according to claim 1, wherein the electric-motor drive has an electric motor which is axially joined to the brake spindle by the output shaft.

3. The brake actuator according to claim 1, wherein the electric-motor drive includes
    a wind-around transmission connected between the electric motor and the brake spindle, and
    an electric motor connected to the spindle by the transmission and aligned essentially in parallel to the brake spindle.

4. The brake actuator according to claim 1, wherein the electric-motor drive device includes an electromagnetic motor brake connected to an electric motor.

5. The brake actuator according to claim 1, wherein the pre-loaded spring device is a spring assembly.

6. The brake actuator according to claim 1, including a first modular nut/spindle unit for converting the rotating movements of the electric-motor drive to a translatory displacement of the brake spindle.

7. The brake actuator according to claim 1, including a yoke device for applying the application force to a caliper of a vehicle brake arranged on one axial end of a first modular nut/spindle unit.

8. The brake actuator according to claim 7, wherein the yoke device is provided with one or more of an emergency release device and a force sensing device.

9. The brake actuator according to claim 6, including a second modular nut-spindle unit having a nut and a spindle sleeve with a lock for maintaining the tensioning of the pre-loaded spring.

10. The brake actuator according to claim 9, wherein the lock is electromagnetic.

11. The brake actuator according to claim 1, including a spindle sleeve rotatably supported on the spindle by an axial bearing.

12. The brake actuator according to claim 1, wherein the transmission includes a toothed belt connecting an electric motor of the electric-motor drive to a pinion, which is on the first sleeve.

13. A brake actuator according to claim 1, including an eccentric lever of an eccentric arrangement connected to an axial end of the brake actuator, which eccentric arrangement is coupled with a caliper of a vehicle brake.

14. A brake actuator according to claim 1, wherein an electric motor of the electric-motor drive acts directly and without a transmission upon the brake spindle.

15. The brake actuator according to claim 1, wherein the spring device comprises a number of individual springs distributed on a circumference of the brake spindle.

16. The brake actuator according to claim 1, wherein the transmission is a gear transmission, which is one of planetary gear and a spur gear.

17. The brake actuator according to claim 1, including a modular nut-spindle unit having a nut and a spindle sleeve with a lock for maintaining the tensioning of the pre-loaded spring.

* * * * *